United States Patent [19]

Williams

[11] Patent Number: 5,369,452
[45] Date of Patent: Nov. 29, 1994

[54] TUBULAR EYEWEAR RETAINER AND METHOD FOR PRODUCING SAME

[75] Inventor: Lendell J. Williams, St. Charles, Mich.

[73] Assignee: Karlen Manufacturing, Inc., St. Charles, Mich.

[21] Appl. No.: 861,256

[22] Filed: Mar. 31, 1992

[51] Int. Cl.⁵ .......................... G02C 5/14; G02C 3/00
[52] U.S. Cl. .................... 351/157; 351/123; 24/3 C
[58] Field of Search ............... 351/123, 156, 157, 178; 2/448, 452, 422; 24/3 C, 115 R, 122.3, 129 R, 131 C, 129 D

[56] References Cited

U.S. PATENT DOCUMENTS

| | | | |
|---|---|---|---|
| 2,481,946 | 9/1949 | Pendleton | 24/3 C |
| 2,539,922 | 1/1951 | Nyberg | 351/157 |
| 2,649,020 | 8/1953 | Wheeler | 24/3 C |
| 2,660,092 | 11/1953 | Bloom | 351/156 |
| 2,704,961 | 3/1955 | Weil | 351/157 |
| 3,874,776 | 4/1975 | Seron | 351/156 |
| 4,541,696 | 9/1985 | Winger et al. | 351/156 |
| 4,696,556 | 9/1987 | Perry, III | 351/156 |
| 4,818,094 | 4/1989 | Lyons | 351/157 |
| 4,955,710 | 9/1990 | Meistrell | 351/157 |
| 5,015,085 | 5/1991 | May | 351/157 |

FOREIGN PATENT DOCUMENTS 2605756  4/1988  France ...................... 351/156

*Primary Examiner*—Rickey D. Shafer
*Attorney, Agent, or Firm*—Learman & McCulloch

[57] ABSTRACT

An eyewear retainer device includes a one-piece sleeve having a main body section and a pair of infolded sections extended within the confines of the main body section and joined to one another with a heat weld to form a double-walled tube-like structure having opposed open ends. A pair of elastic collars are captured between the double walls of the tube-like structure and surround the open ends thereof for gripping the temples of eyeglasses inserted therein. The double-walled tube-like structure is folded to form a loop with free ends and provided with a keeper which is slidable toward and away from the free ends for adjusting the effective length of the retainer device therebetween. The invention includes the method of making the eyewear retainer.

17 Claims, 3 Drawing Sheets

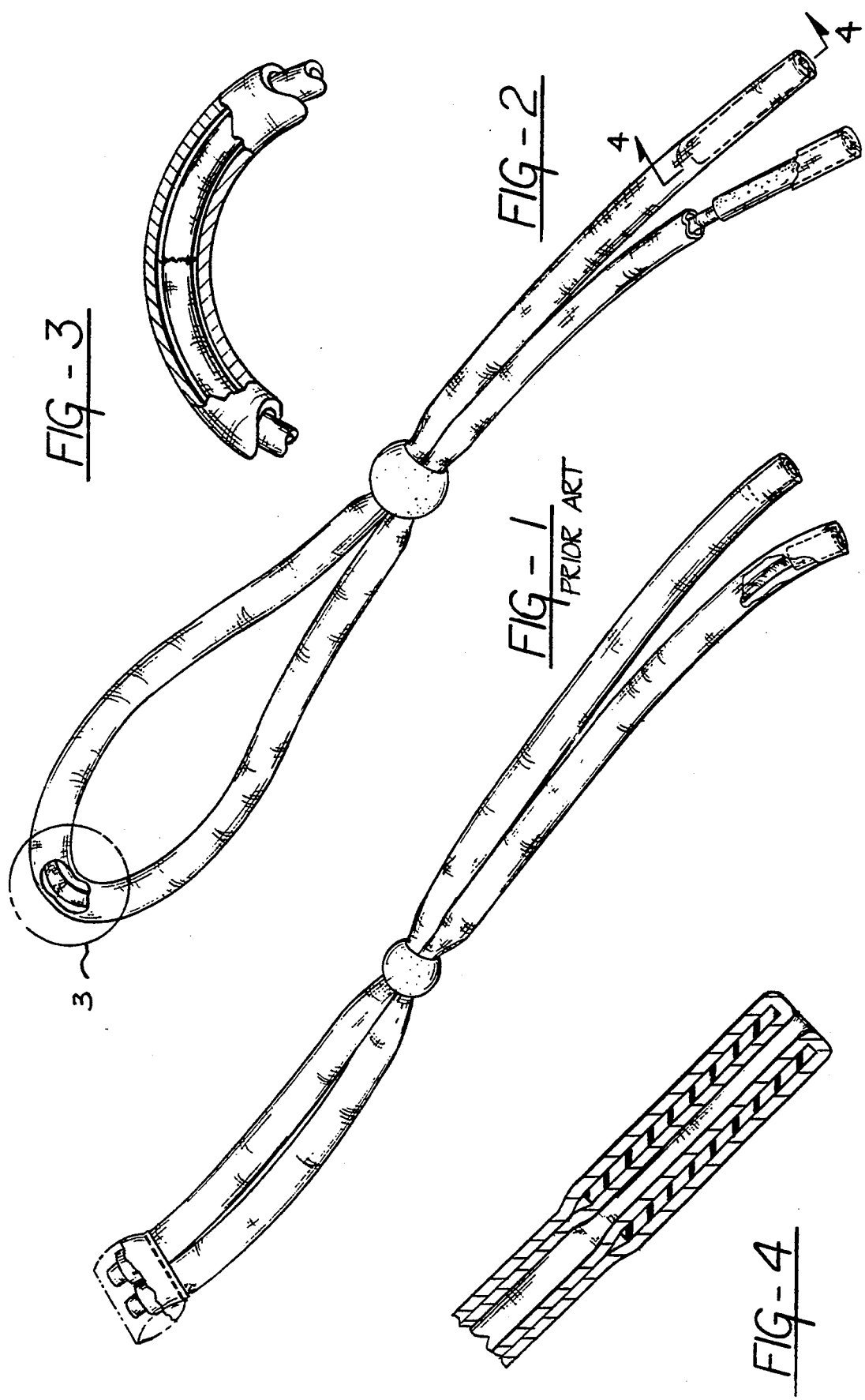

TUBULAR EYEWEAR RETAINER AND METHOD FOR PRODUCING SAME

BACKGROUND OF THE INVENTION

1. TECHNICAL FIELD

The present invention relates to an eyewear retainer device attachable to the temples of eyeglasses, sun glasses or the like for retaining the eyewear around the neck of an individual and/or for preventing such eyewear from inadvertently falling off when being worn by the individual.

2. DESCRIPTION OF THE RELATED PRIOR ART

Many individuals who wear either eyeglasses, sun glasses or other eyewear choose to use some type of retainer device of the type attachable to the temples of the eyewear for suspending the eyewear around the individual's neck when not in use, or for retaining the eyewear on the nose of the individuals when in use, or simply as a fashion accessory.

FIG. 1 of the attached drawings illustrates a conventional prior art tubular-type eyewear retainer. This retainer has a tube of double wall construction which is open at each end to accommodate the temples of the eyeglasses. Two short sections of surgical tubing are captured between the double layers of the tube and are positioned at the open ends of the tube for gripping eyeglass temples inserted into the open ends. The double walled tube is formed of two initially separate pieces of cotton sleeve material which are each infolded to capture the sections of surgical tubing between the resultant double walls of the tube halves. After a keeper ring is utilized to capture and to adjustably secure the sleeve halves together, the ends of the sleeve halves are brought together and joined by an external patch which is sewn to each of the tube halves. The tubular eyeglass retainer device of FIG. 1 typifies the known constructions which rely on an external joint, such as the sewn-on patch of FIG. 1, to join the ends of the tubes together. The external patch is, in my view, somewhat unsightly and prevents the keeper from being removed and replaced.

SUMMARY OF THE INVENTION AND ADVANTAGES

An eyewear retainer device according to the present invention utilizes a single piece of sleeve material to provide a main external body section which telescopically receives a pair of infolded end sections extended into the confines of the middle section, to form a double-walled tube-like structure having opposed ends which are open for internally receiving eyewear temples therein. A pair of elastic collars are captured between the double walls of the tube and surround the open ends for constricting the open ends so as to grip and retain eyeglass temples which are inserted in them. The retainer device disclosed includes an internal coupling disposed within the confines of the main body section for coupling the infolded sections together wholly internally of the main body section.

The subject invention also contemplates an improved method for producing a tubular eyewear retainer device from a single piece of flexible sleeve material having a main body section and opposed first and second end sections. The method may comprise the steps of: inserting a first elongate elastic collar within the first end section of the sleeve material; infolding the first end section through the first elastic collar and then into the confines of the main body section to capture the first elastic collar between the infolded first end section and the main body section; inserting a second elongate elastic collar within the second end section of the same sleeve material to a position inward of the infolded first end section; connecting the infolded first end section with the second end section to form a joint which, after the second end section and second collar are worked outwardly over and beyond the joint to create a second infolded section, is wholly internal of the main body.

One of the principal advantages of the present invention is that there are no joints external to the main body section. The joint coupling the infolded end sections together is wholly internal of, and thus surrounded by, the main body section such that the joint is visually undetectable.

A further object of the invention is to provide a structure of the character described which permits removal and replacement of the keeper ring when desired.

Another advantage of the tubular eyewear retainer device of the present invention is that it is less costly to produce, is aesthetically more pleasing, and is more durable than any of the prior art retainer devices which are known to me.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a prior art eyewear retainer device, with an intermediate portion thereof shown partially broken away;

FIG. 2 is a perspective view of an eyewear retainer device constructed in accordance with the present invention, with an intermediate portion also being shown partially broken away to illustrate the different construction of the present invention;

FIG. 3 is an enlarged, fragmentary, partly sectional, perspective view of the encircled portion 3 of FIG. 2, illustrating the weld joint which is formed;

FIG. 4 is an enlarged cross sectional view taken along the lines 4—4 of FIG. 2.

DETAILED DESCRIPTION OF THE DRAWINGS

Figure 5:
FIGS. 5 through 13 illustrate the preferred steps involved in producing the retainer device of the subject invention.

FIG. 1 illustrates a prior art eyewear retainer device generally indicated by the reference numeral 10. This device 10 comprises a pair of connected tubes 12 of double wall construction having free ends 13, 15 which are open for receiving the temples of eyeglasses internally within the free ends of the tubes 12. A pair of expandable elastic collars 14 are captured between the double layers of each of the tubes 12 and surround the open ends for constricting the ends in order to grip and retain the temples inserted therein.

Each double-walled tube 12 in FIG. 1 is formed of two separate pieces of fabric sleeve material 16, 18 which are infolded to capture the elastic collars 14 between the double walls of each tube half 16, 18 at one end. A keeper 20 is slid over the opposite ends of the sleeve halves 16, 18 after which these exposed free ends of the sleeve halves are positioned adjacent one another and joined by a patch 22 sewn to each of the tube halves 16, 18 by a stitch 24.

FIG. 2 illustrates a preferred embodiment of a tubular eyewear retainer device 30 constructed in accordance with the present invention. The device 30 comprises a one-piece sleeve 32, fabricated preferably from preshrunk polyester filament material, which is woven into a flexible sleeve-like structure having an outer body section 34 and a pair of joined infolded end sections 36, 38 respectively, that, extended into the confines of the outer body section 34, form an overall double-walled tube-like structure. The body section 34 forms the outer wall and the infolded end sections 36, 38 together form the inner wall. The infolding of the end sections 36, 38 creates the open ends 40, 42 of the double-walled tube which are dimensioned for receiving the temples of eyeglasses into the interior of the double-walled tube.

A pair of elastic collars 44, 46 formed, for example from latex tubing are captured between the double walls of sleeve material and constrict the open ends 40, 42 to grip and retain eyewear temples which are inserted therein. The elastic collars 44, 46 each comprise a section of surgical latex tubing (FIG. 4) approximately two inches long with an inner diameter of ¼ inches and a wall thickness of about 1/16 inches.

The retainer device 30 also includes an internal coupling 48, disposed within the confines of the main body section 34 for joining the infolded first and second end sections 36, 38 together wholly internally of the main body section. The coupling 48 comprises a heat-welded joint (FIG. 3) that permanently fuses the end sections 36, 38 together and is free of the surrounding outer body section 34. If a non-weldable fabric were used the ends could, for example, be united by sewing or with a crimped metal sleeve.

The double-walled tube is preferably folded in half, as shown in FIG. 2, and provided with an adjustable retainer 50, such as a keeper ring, which is movable toward and away from the open ends 40, 42 for adjusting the effective length of the double-walled tube between the open ends 40, 42. Because of the relatively small size of the weld joint 48, the keeper 50 may be removed from the folded end of the folded tube-like structure, if desired, and interchanged with another style or shape of adjustment bead. It cannot readily be removed over the ends 40, 42.

As can be seen best in FIG. 2, the double-walled retainer device 30 presents an outer casing (i.e., the body 34) which is smooth, continuous and uninterrupted by joints or patches, and which surrounds and conceals the weld joint 48 therein.

A preferred method for producing the above-described eyewear retainer device 30 is illustrated in FIGS. 5 through 13.

FIG. 5 illustrates the single piece or length of sleeve material 32 having the central body section 34 and the opposed first and second end sections 36, 38.

Figure 6:
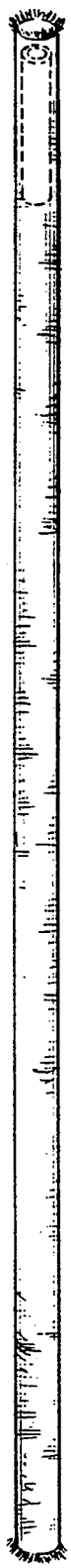
Figure 7:

FIG. 6 shows the first elastic collar 44 inserted into the first end 36 of the sleeve 32 after which the first end 36 is closed as at 36a with a heat weld, as shown in FIG. 7. Since the sleeve material is a heat weldable material, the material will melt and fuse together when heated above its melting point. The necessary heat can be supplied, for instance, from a hot weld iron W as shown in FIG. 7.

Figure 8:
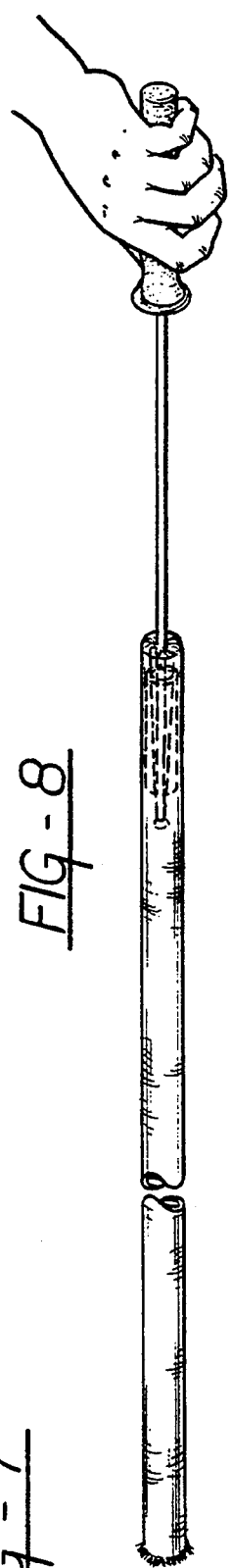
Figure 9:
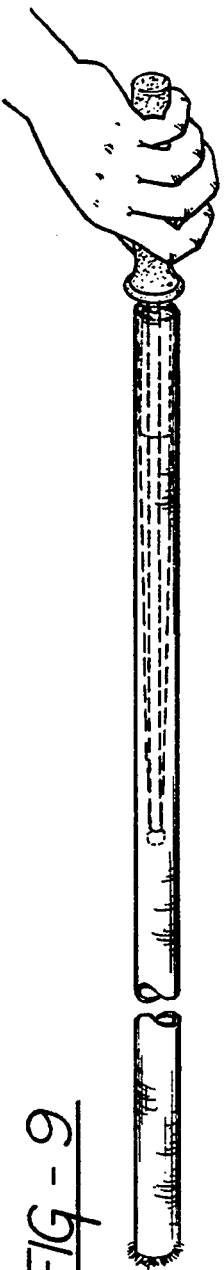
Figure 10:
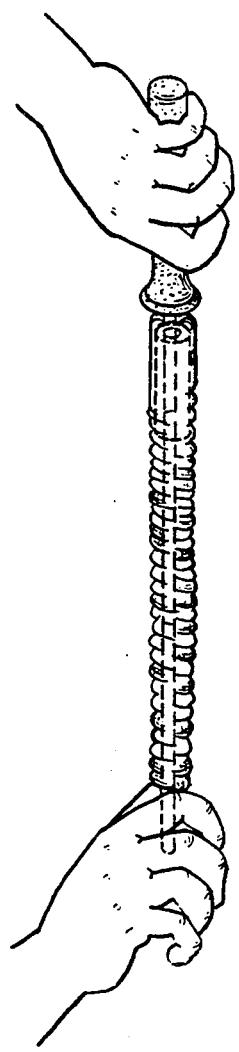

FIGS. 8 and 9 illustrate the steps of engaging the closed first end 36 with a push rod 52 and then inserting the push rod through the first collar 44 and into the confines of the main body 34 to infold the first end section 36. After the first end section 36 has been fully infolded, the second end section 38 is slid onto the push rod 52, as shown in FIG. 10, until the welded first end 36 is exposed beyond the main body section 34.

Figure 11:
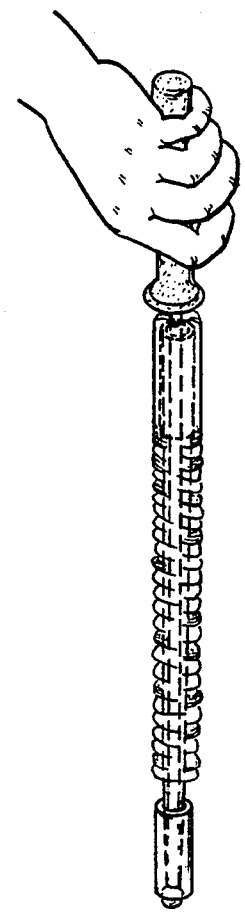
Figure 12:
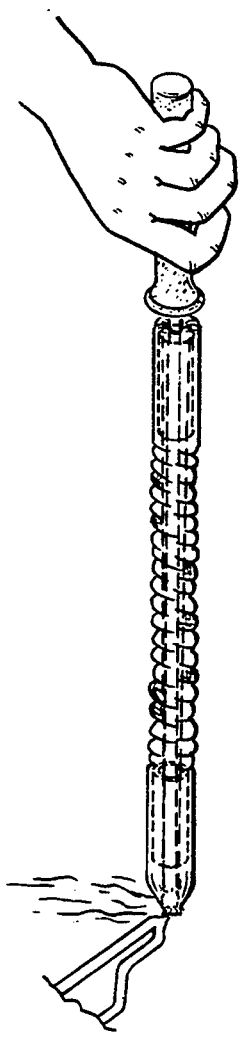

Once the first end section 36 has been exposed, the second elastic collar 46 is pushed onto the push rod 52 (as shown in FIG. 11) and moved in over the first infolded end section 36 on rod 52 to a position beyond the closed end 36a. After the collar 46 is positioned, the end sections 36, 38 are brought together, by rolling or pushing back a portion of the end 38, and the push rod 52 is slightly retracted, as shown in FIG. 12.

The adjacent exposed first and second end sections 36, 38 are then heat welded together, such as with the hot weld iron W, to form the weld joint 48. This welding step closes the end 38 as at 38a at the same time it welds end 38 to the end 36a. The sleeve material and second collar 46 are then manipulated to work the welded joint 48 through the second collar 46 and into the confines of the main body section 34 until the joint 48 is approximately centered between the collars 44, 46. The end section 38 is rolled back over the collar 46 to effectively infold the end sections 38, while the collar 46 is moved outwardly to the FIG. 13 position. The result is the formation of the aforementioned double-walled tube-like structure with the main body portion 34 forming the outer wall and the infolded joined end sections 36, 38 defining the inner wall thereof. With the sections 36, 38 joined, the infolded end sections cannot work back out of the collars 44, 46.

Figure 13:
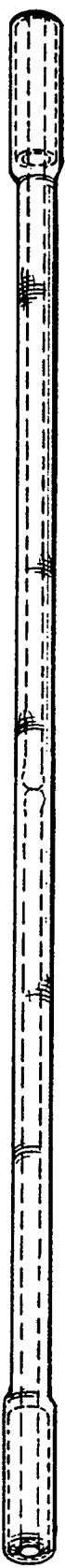

The double-walled tube-like structure of FIG. 13 is then folded in half and the apertured keeper 50 slid over the fold, where it is movable toward and away from the open ends 40, 42 for adjusting the effective length of the retainer device 30 between the open ends 40, 42.

White not the preferred embodiment, the eyewear retainer could be formed in the same way from an elastic fabric, without incorporating collars 44 and 46. The open ends 36, 38 are fused or integrated and then infolded as though they were being infolded between collars 44 and 46 to form open ends of a diameter which can elastically grip the temple ends. The infolded ends are fused or otherwise integrated in the manner described.

The invention has been described in an illustrative manner, and it is to be understood that the terminology which has been used is intended to be in the nature of words of description rather than of limitation. Many modifications and variations of the present invention are possible in light of the above teachings and it is, therefore, to be understood that the invention may be practiced otherwise than as specifically described.

I claim:

1. An improved method for producing a tubular eyewear retainer device from a single length of flexible sleeve material having a central body section and first and second end sections extending oppositely in prolongation of the central body section, said method comprising the steps of; inserting a first elastic collar within the first end section of the sleeve material; and infolding the first end section through the first elastic collar and then into the confines of the central body section to capture the first elastic collar between the infolded first end section and the central body section, wherein the improvement comprises the steps of:

(a) inserting a second elastic collar within the second end section of sleeve material; and (b) joining the first end section to the second end section to form a joint and infolding the second end section through said second elastic collar into the confines of the central body section.

2. A method according to claim 1 including the steps of extending the infolded first end section through the second end section so as to expose adjacent terminal ends of the first and second end sections externally of the central body section before joining them together and thereafter positioning the joint formed within the confines of the central body section upon infolding the second end section into the central body section.

3. A method according to claim 1 wherein the joint is formed by permanently fusing the first and second end sections together.

4. A method according to claim 1 wherein infolding of the first end section is effected by engaging the first end section with a push rod and thereafter moving the push rod through the first elastic collar and into the confines of the central body section to infold the first end section through the first elastic collar and into the central body section.

5. A method according to claim 4 including the step of closing the first end section after the first elastic collar has been inserted therein, and before inserting the first end section through the first elastic collar.

6. A method according to claim 4 including the step of sliding the second end section over the push rod and first end section already on the push rod to a position wherein its terminal end is aligned with the terminal end of the first end section so as to expose the first and second end sections externally of the main body section before joining the first and second end sections and extending the second end section into the confines of the main body section.

7. A method according to claim 1 wherein the second end section is infolded into the central body section by manipulating the sleeve material to work the joint through the second elastic collar and then into the confines of the central body section so as to be concealed therein.

8. A method according to claim 1 including the step of folding the retainer in half and then attaching a keeper thereabout which is movable toward and away from the elastic collars for adjusting the effective length of the retainer between the collars.

9. The method of claim 1 wherein the second end section is pushed over the infolded first end section and second collar and infolding of the second end section is accomplished by rolling the second end section back over the second collar while working the second collar outwardly.

10. An eyewear retainer device comprising: a single length of flexible sleeve material providing a main body section with end sections extending oppositely in prolongation of said main body section, the end sections being infolded into the confines of said main body section to form a double-walled tube having opposite ends with openings for internally receiving eyeglass temples therein; a pair of temple retaining collars captured between the walls of said tube and surrounding said openings for constricting said tube ends to thereby grip and retain the eyeglass temples inserted in said openings; and an internal coupling disposed within the confines of said main body section for coupling said infolded end sections wholly internally of said main body section.

11. A device according to claim 10 wherein said coupling means comprises a welded joint permanently fusing said infolded sections together within the confines of said main body section.

12. A device according to claim 10 wherein said coupling means is independent of said surrounding main body section.

13. A device according to claim 10 wherein said sleeve material comprises woven pre-shrunk polyester fabric.

14. A device according to claim 10 wherein said double-walled tube is folded to form a loop, and provided with loop length adjustment means disposed thereabout which is movable toward and away from said tube ends for enabling adjustment in the effective length of said tube.

15. An eyewear retainer comprising a continuous length of flexible sleeve fabric material providing a body section and end sections extending oppositely in prolongation of said body section, said end sections being infolded into said body section so as to extend into the confines of the body section to form a double-walled tube having opposed tube ends with openings for internally receiving eyeglass temples therein; a pair of temple retaining collars captured between the double walls of said tube and surrounding said openings for gripping and retaining the eyeglass temples inserted therein; and a joint integrating said infolded end sections within the confines of the body section for preventing said infolded end sections from working back out of said collars.

16. An improved method for producing a double-walled tubular eyewear retainer device from a single length of flexible sleeve material providing a central body section and first and second end sections extending oppositely in prolongation of the central body section, wherein the improvement comprises the steps of;

(a) infolding the first and second end sections into the confines of the central body section, and joining the infolded first and second end sections directly to one another to provide a concealed joint wholly within the confines of the central body section, to form a double walled body with free ends having openings to receive eyeglass temples therein.

17. A method according to claim 16 wherein the first infolded end section is extended beyond the central body section through the second end section before the second end section is infolded and before the end sections are joined together so as to expose adjacent terminal ends of the first and second end sections externally of the central body section, and the exposed terminal ends are joined together after which the joint is positioned within the confines of the central body section upon infolding of the second end section.

* * * * *